Jan. 19, 1932.    W. SCOTT    1,841,418
FRONT DRIVEN STEERING WHEEL MOUNTING
Filed July 24, 1928
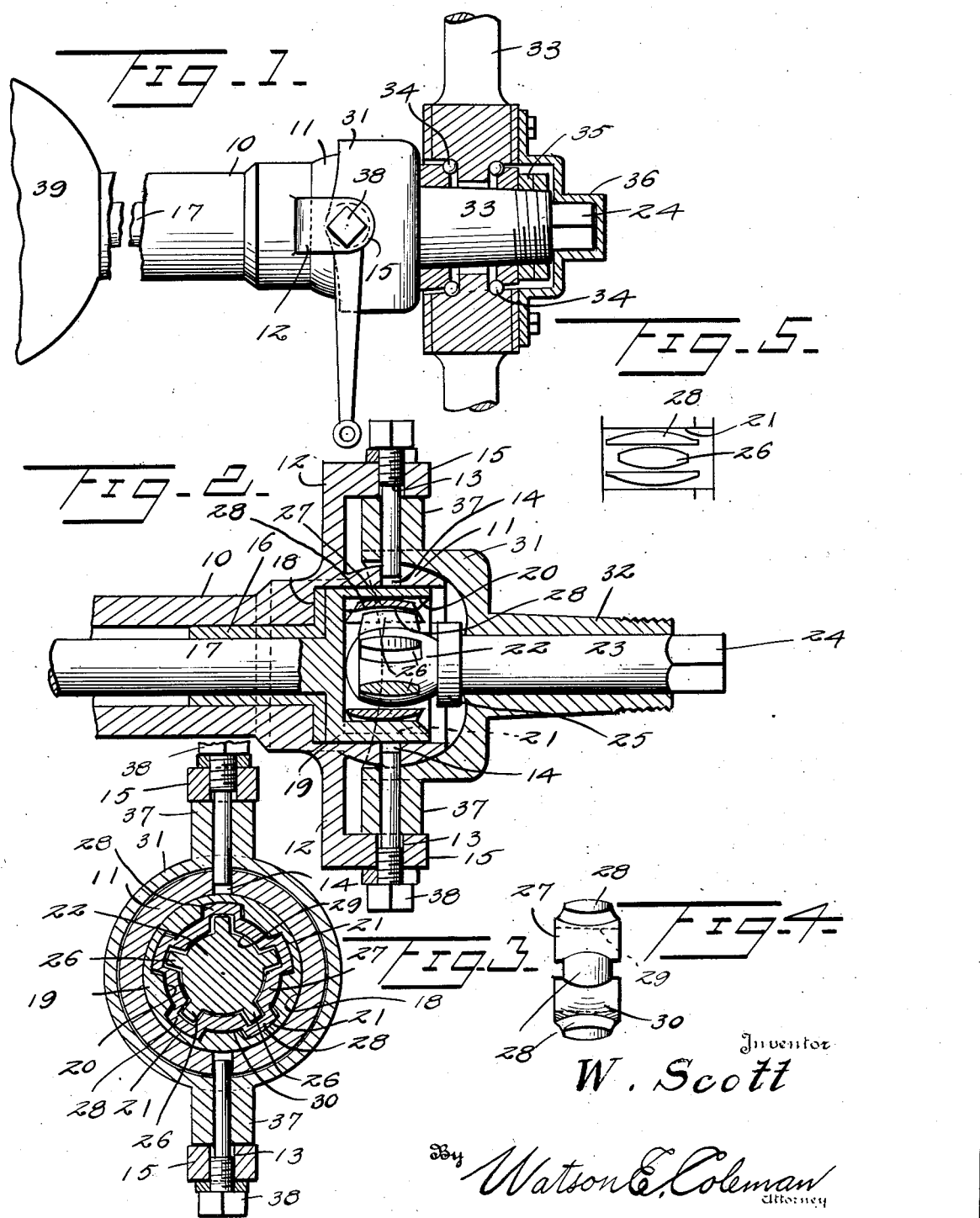

Patented Jan. 19, 1932

1,841,418

UNITED STATES PATENT OFFICE

WALTER SCOTT, OF SHERIDAN, WYOMING

FRONT DRIVEN STEERING WHEEL MOUNTING

Application filed July 24, 1928. Serial No. 295,063.

This invention relates to driven steering wheel mountings and has for an important object thereof the provision of a structure such that the axle and stub axle combine to produce a housing within which may be arranged the universal joint of a drive shaft.

A further object of the invention is to provide in a structure of this character an improved universal joint of such construction that a positive and efficient drive is provided in all angular positions of the shaft sections.

A still further object of the invention is to produce a construction of this character which may be readily manufactured and which, at the same time, will provide a durable and rigid mounting for the steering wheel and a complete housing for the universal joint, thus insuring possibility of proper lubrication.

These and other objects I attain by the construction shown in the accompanying drawings, wherein for the purpose of illustration is shown a preferred embodiment of my invention and wherein:—

Figure 1 is a plan view partially in section showing a driven steering wheel mounting constructed in accordance with my invention;

Figure 2 is a vertical sectional view therethrough;

Figure 3 is a section at right angles to the view of Figure 2;

Figure 4 is a fragmentary side elevation of the ring;

Figure 5 is a diagrammatic view showing the coaction of the elements of the universal joint of the drive shaft.

Referring now more particularly to the drawings, the numeral 10 indicates a tubular axle housing, the outer end of which is formed as the male element 11 of a ball and socket joint and is provided with vertically extending arms 12 inwardly of this joint, which have horizontal ears 15 provided with threaded sockets 13 axially aligning with the vertical axis of the joint. The element 11 of the joint is provided with sockets 14 aligning with the sockets 13 of the horizontal ears 15 of the arms 12. The axle housing 10 has suitable bearings 16 for the axle 17 and the section 11 of the ball and socket joint has an enlarged bore 18 into which the outer end of this axle extends. At its outer end, the axle is provided with a head 19 having an axial bore 20, the wall of which is provided with longitudinally extending grooves 21. This head constitutes a female section of a ball and socket type universal joint. The male section comprises a ball head 22 from which projects a stub shaft 23, the extremity of which is squared, as indicated at 24. Adjacent the head, the shaft is provided with a thrust shoulder or flange 25. The head 22 has projecting outwardly from the sides thereof ribs 26.

The ribs 26 correspond in number and arrangement to the grooves 21 of the wall of the bore 20, and these ribs have their greatest width at their centers and gradually decrease in width toward their ends, the side walls being longitudinally curved. The outer faces of the ribs 26 are curved upon an arc which is equal to the diameter upon which such outer faces are disposed both transversely and longitudinally of the ribs.

Between the head 22 and the wall of the bore, I insert a supplemental ring element 27 having an exterior diameter approximating the diameter of the bore 20 and having upon its outer wall ribs 28, the outside diameter of which approximates the diameter at the bases of the grooves 21. These ribs 28 are curved both longitudinally and transversely upon this diameter and the side faces of the ribs are arcuately oppositely curved so that these ribs, as in the case of the ribs 26, decrease in diameter toward their ends. The wall of the bore 29 of the ring element has grooves which are preferably so formed that they extend into the ribs 28 and these grooves receive the ribs 26 of the head of the male element of the joint.

It will be obvious that the ring element 27, whose outer wall 30 is longitudinally curved upon the approximate diameter of the bore 20, may oscillate in either direction, so that it has, of itself, a universal engagement with the female head. This universal engagement is, however, necessarily somewhat restricted in practice as provision must be made for supporting driving strains and the limits of reduction of thickness of the ribs must, for this reason, be taken into consideration. However, the head 22 of the male element has a similar engagement with the ring element 27, with the result that the universal action is doubled in its transmission from the shaft 17 to the stub shaft 23.

Thus, the driving properties of this type of joint are retained while the angle at which the shafts may be disposed in practice is materially decreased as regards a straight angle.

The female section 31 of the axle housing bears a hollow externally tapered stub 32 through which the stub shaft 23 may project and beyond the outer end of which, the squared portion 24 of this stub shaft extends. The wheel 23 is mounted upon this stub through the usual bearings 34 and is retained in the usual manner by nuts 35 threaded upon the extremity of the stub.

To the exterior face of the wheel is secured a cap 36, which fits upon the end portions 24 of the stub shaft and provides a driving connection between this shaft and the wheel. The female section 31 has apertured bosses 37 for the passage of securing elements or pivot bolts 38, the inner ends of which extend into the socket 14 of the female section 11 and the outer ends of which are threaded in the openings 13. The axle housing 10 may also house a differential partially shown and generally designated at 39 in Figure 1 from which the drive for the shaft 17 is derived.

It will be obvious that by a construction of this character, a complete enclosure of the universal joint may be had and a construction accordingly provided which may be well lubricated and which will not be subject to excessive wear. Since this structure is capable of a certain range of change and modification without materially departing from the spirit of the invention, I do not limit myself to such specific structure except as hereinafter claimed.

I claim:—

In combination, a member having a head formed with a bore the wall of which is slotted longitudinally, a second member having a spherical head arranged within the bore and provided with longitudinal ribs, and a sleeve arranged between said heads and provided with inner longitudinal grooves receiving the ribs of the spherical head and with outer longitudinal ribs engaging in the grooves of said first head, the outer faces of the ribs of said spherical head and sleeve being arcuately curved, and the ribs of the spherical head and sleeve decreasing in width from their centers toward their ends and the grooves of the sleeve being formed in alinement with and extending into the ribs thereof.

In testimony whereof I hereunto affix my signature.

WALTER SCOTT.